UNITED STATES PATENT OFFICE.

BURR W. TUTTLE, OF CHICAGO, ILLINOIS.

CEMENT.

No Drawing.  Application filed December 24, 1923. Serial No. 682,582.

The object of my invention is the production of a cement adapted to be used in connection with enamel ware, porcelain, vitreous ware, or ceramics in general. It is, however, particularly intended for use in connection with white material of the kind set forth and for use either in cementing parts together or repairing objects made of such material.

My composition consists of asbestos mixed with oxide of zinc with a sufficient amount of liquid binder, such as water glass or silicate of soda added thereto to make a stiff or heavy paste. A preferred form of this composition comprises two parts, by weight, of finely ground asbestos or a composition thereof, commercially known as asbestine, and one part of zinc oxide together with a suitable amount of water glass to make a heavy paste.

These ingredients are thoroughly mixed. When water glass is used as the binding element, usually about eight ounces of water glass is used to one pound of the mixture. The water glass is the usual commercial article such as silicate of sodium or potassium, also known as "soluble glass."

When shellac is used as the binding element, a preferred form of the composition comprises six (6) parts, by measure, of oxide of zinc, seven (7) parts of white asbestos or asbestine, and sufficient commercial liquid white shellac to make a stiff paste, preferably of about the consistency of putty, or to make a proper balance, so that the cement may be readily applied.

This forms a white cement which is particularly useful for repairing flaws or injuries in enamel or porcelain bath tubs, wash bowls or other articles formed of these or similar materials. The cement is applied in the usual manner and will readily harden to form a substantially solid patch or joint.

These ingredients may be varied, if it is desired, for different conditions and it will also be noted that any suitable coloring matter may be added to adapt the composition to special conditions and therefore I do not wish to be limited to the exact portions herein described, except as specified in the following claim in which—

I claim:

A cement comprising approximately two parts, by weight, of asbestos and one part of oxide of zinc mixed with sufficient water glass to make a heavy paste, substantially as described.

BURR W. TUTTLE.